United States Patent [19]

Lagoni

[11] 4,295,160

[45] Oct. 13, 1981

[54] SIGNAL PROCESSING CIRCUIT HAVING A NON-LINEAR TRANSFER FUNCTION

[75] Inventor: William A. Lagoni, Indianapolis, Ind.

[73] Assignee: RCA Corporation, New York, N.Y.

[21] Appl. No.: 190,722

[22] Filed: Sep. 25, 1980

Related U.S. Application Data

[63] Continuation of Ser. No. 38,100, May 11, 1979, abandoned.

[51] Int. Cl.$^3$ ............................................. H04N 9/535
[52] U.S. Cl. ....................................... 358/31; 358/36; 358/37
[58] Field of Search .................... 358/31, 36, 37, 39, 358/4, 32, 166, 167, 22, 184; 307/230; 328/142, 143; 330/97, 103, 110, 282, 291

[56] References Cited

U.S. PATENT DOCUMENTS

| | | | |
|---|---|---|---|
| 3,436,559 | 4/1969 | Wajs | 328/142 |
| 3,715,477 | 2/1973 | Olson et al. | 358/167 |
| 3,798,353 | 3/1974 | Illetschko | 358/37 |
| 3,999,060 | 12/1976 | Skogerlund | 330/103 |
| 4,074,321 | 2/1978 | Miller | 358/31 |
| 4,096,516 | 1/1978 | Pritchard | 358/31 |

OTHER PUBLICATIONS

McMann et al., "Improved Signal Processing Techniques in Color Television Broadcasting", Journal of SMPTE, Mar. 1968, vol. 77, pp. 221-228.

*Primary Examiner*—John C. Martin
*Attorney, Agent, or Firm*—Eugene M. Whitacre; William H. Meagher; Ronald H. Kurdyla

[57] ABSTRACT

An electrical circuit suitable for processing vertical detail signal information of a video signal is disclosed. The circuit includes an amplifier and an associated feedback impedance network for determining the circuit gain. Different values of feedback impedance are established in accordance with the operation of a signal responsive switching network included in the feedback network, to establish a signal amplitude transfer function wherein different amounts of signal gain are imparted to signals having amplitudes within prescribed ranges. Small amplitude signals subject to restoration are translated with a prescribed restoration gain. Moderate amplitude signals subject to enhancement (peaking) are translated by amplifying small amplitude excursions thereof with the restoration gain and by amplifying peak amplitude excursions with a gain greater than the restoration gain. Large amplitude signals subject to paring (amplitude reduction) are translated by amplifying small amplitude excursions thereof with the restoration gain, amplifying moderate amplitude excursions with a gain greater than the restoration gain, and amplifying peak amplitude excursions with a gain less than the restoration gain.

12 Claims, 7 Drawing Figures

SIGNAL PROCESSING CIRCUIT HAVING A NON-LINEAR TRANSFER FUNCTION

This is a continuation of application Ser. No. 038,100, filed May 11, 1979, now abandoned.

This invention relates to an electrical circuit having a non-linear amplitude transfer characteristic, and more particularly, to such a circuit for selectively providing amplitude restoration, peaking and attenuation of picture vertical detail information in a color television receiver including a comb filter or the like for separating the luminance and chrominance components of a color television signal.

In a color television system such as the system developed by the United States, the luminance and chrominance components of a color television signal are disposed within the video frequency spectrum in frequency interleaved relation, with the luminance components at integral multiples of the horizontal line scanning frequency and the chrominance component at odd multiples of one-half the line scanning frequency. Various comb filter arrangements for separating the frequency interleaved luminance and chrominance components of the video signal are known, for example, from U.S. Pat. No. 4,143,397 (D. D. Holmes) and U.S. Pat. No. 4,096,516 (D. H. Pritchard) and the references cited therein.

A combed luminance signal which appears at the luminance output of the comb filter has been subjected to a "combing" effect over its entire band. The combing action over the high frequency band portion which is shared with chrominance signal components has the desired effect of deleting chrominance signal components. Extension of this combing action into the low frequency band portion which is not shared with the chrominance signal components, however, is not needed to effect the desired removal of chrominance signal components, and serves only to unnecessarily delete luminance signal components. Components in the lower end of the unshared band which are subject to such deletion are representative of "vertical detail" luminance information. Preservation of such vertical detail is desirable to avoid loss of vertical resolution in the luminance content of a displayed image.

One arrangement for preserving the vertical detail information employs a low pass filter coupled to the output of the comb filter at which the "combed" chrominance component appears. The upper cut-off frequency of this filter lies below the band occupied by the chrominance signal component (with an illustrative choice being just below 2 MHz). The filter selectively couples signals below the chrominance band from the chrominance output of the comb filter to a combining network where the selectively coupled signals are summed with combed luminance output signals from the comb filter. The combined signal includes a "combed" high frequency portion (occupying a band of frequencies above the filter cut-off frequency) from which chrominance signal components have been removed, and an uncombed (i.e., "flat") low frequency portion in which all luminance signal components have been preserved.

It is sometimes desirable to enhance or peak the vertical detail information of a displayed image by adding back to the luminance signal a greater amount of the vertical detail signal than is required to restore the luminance signal to its original form (i.e., a "flat" amplitude characteristic). The additional vertical detail signal then serves to emphasize vertical detail information so as to enhance picture detail resolution. For low level luminance signals, however, such enhancement tends to produce objectionable visible effects when noise interference is present and undesirably enhanced along with the vertical detail information of the luminance signal.

Also in this instance, alternate line set-up variations (ALSUV) when present in the video signal are also undesirably enhanced. The ALSUV phenomenon is a form of low level signal interference manifested by variations in the black level of the video signal from line-to-line, and may be caused by misalignment of signal processing systems at the broadcast transmitter, for example. The ALSUV interference is particularly noticeable for low level video signals of about five percent of the maximum expected video signal amplitude, and produces objectionable visible effects on a reproduced image which are undesirably magnified when vertical detail enhancement is provided.

A technique for minimizing the adverse effects of noise and other undesirable components of a video signal employs a process commonly referred to as signal "coring," wherein small amplitude excursions of the signal (including noise) are removed as described in U.S. Pat. No. 3,715,477, for example.

One advantageous system which accomplishes coring of the vertical detail signal in a manner which does not impair (e.g., "smear") vertical detail information, particularly with regard to low level detail signal information which is to be restored to the luminance signal, is described in a copending, concurrently filed U.S. patent application of W. A. Lagoni and J. S. Fuhrer entitled "Video Image Vertical Detail Restoration And Enhancement," assigned to the present assignee. The system described therein also advantageously provides for enhancement of the vertical detail information substantially without simultaneously enhancing interfering signal components such as noise and alternate line set-up variations.

A system wherein large amplitude vertical detail signals are pared (amplitude reduced or attenuated) to prevent kinescope "blooming" which would otherwise distort or obscure detail information is disclosed in a copending, concurrently filed U.S. patent application of J. S. Fuhrer entitled, "Non-Linear Processing Of Video Image Vertical Detail Information," assigned to the present assignee.

Consistent with the techniques described in the last-mentioned copending patent applications, in accordance with the principles of the present invention there are disclosed herein signal processing circuits having a nonlinear amplitude transfer function for selectively providing restoration, enhancement (peaking), and paring for small, moderate, and large amplitude video signals, respectively.

A circuit in accordance with the present invention comprises an amplifier having an input terminal and an output terminal, including an amplifier device with an input and an output. A first feedback path including a first impedance is coupled between the input and output of the amplifier device. A second feedback path including a second impedance and a threshold switching network is also coupled between the output and input of the amplifier device. The switching network has an input coupled to the output of the amplifier device, and an output coupled to the output terminal of the circuit. The switching network exhibits one conductive state in response to signal amplitudes of first magnitudes within a first range, and another conductive state in response to signal amplitudes of second magnitudes greater than the first magnitudes within a second range.

In accordance with a feature of circuits according to the invention, a third feedback path is provided between the output and input of the amplifier device. The third path includes a third impedance and an additional threshold switching network with an input coupled to the output of the switching network in the second feedback path. The additional switching network exhibits one conductive state in response to signal amplitudes of the first and second magnitudes, and another conductive state in response to signal amplitudes of third magnitudes greater than the first and second magnitudes within a third range.

According to a further feature of circuits according to the invention, the second feedback path also includes an additional impedance. The switching network in the second path is coupled to the additional impedance for switchably controlling the current conduction through the additional impedance.

In accordance with another feature of the invention, circuits according to the principles of the present invention are employed in a color television receiver or similar system for translating vertical image detail information signals with a non-linear transfer function with respect to prescribed ranges of vertical detail signal amplitude.

Figure 1:
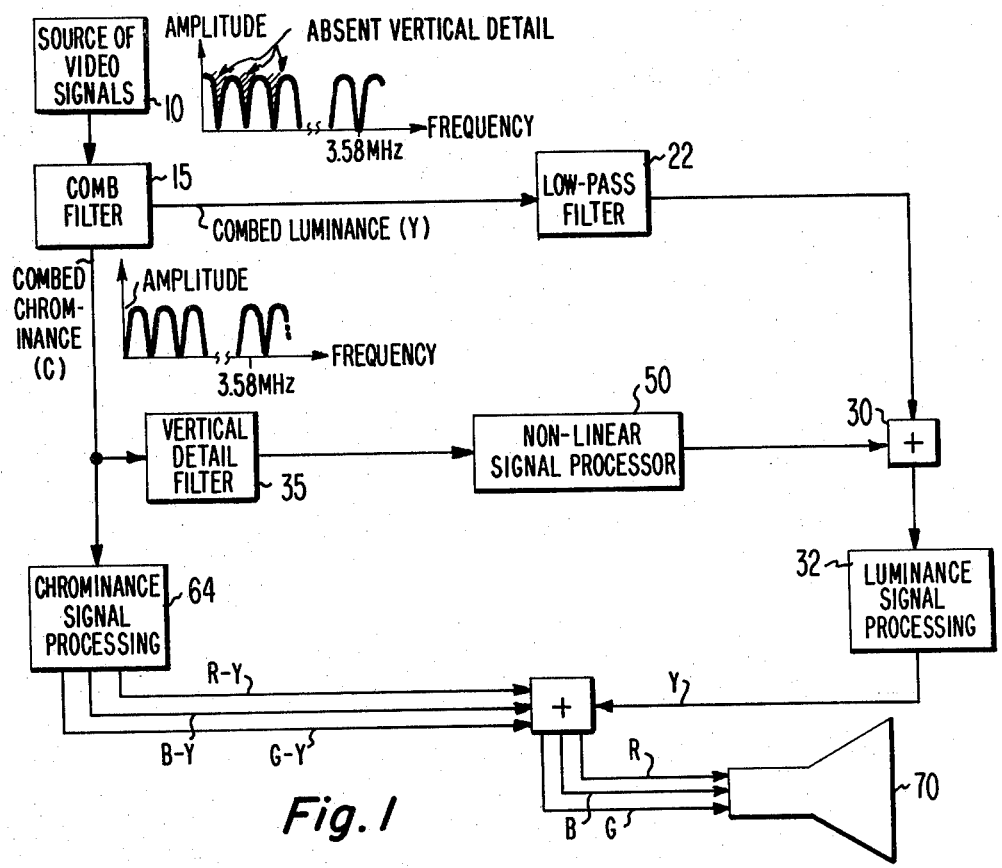
FIG. 1 illustrates a block diagram of a portion of a color television receiver employing a non-linear signal processor according to the present invention.

In FIG. 1, a source of composite color video signals 10 including luminance and chrominance components supplies video signals to an input of a comb filter 15 of known configuration, such as a comb filter employing charge transfer devices (CCD's) as shown in U.S. Pat. No. 4,096,516. The luminance and chrominance components are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a subcarrier signal of 3.58 MHz amplitude and phase modulated with color information. The amplitude versus frequency response of comb filter 15 with respect to luminance combing action exhibits a peak amplitude response at integral multiples of the horizontal line scanning frequency (approximately 15,734 Hz), extending from D.C. or zero frequency, and an amplitude null at odd multiples of one-half the line scanning frequency, including the 3.58 MHz chrominance subcarrier frequency. The amplitude versus frequency response of comb filter 15 with respect to chrominance combing action exhibits a peak amplitude response at odd multiples of one-half the line frequency including 3.58 MHz, and an amplitude null at integral multiples of the line frequency.

A "combed" luminance signal (Y) from the luminance output of comb filter 15 is coupled via a low pass filter 22 to one input of a signal combining network 30. Filter 22 is arranged to pass all luminance signals below a cut-off frequency of approximately 4 MHz, and serves to remove noise and clock frequency components of switching signals associated with the switching operation of comb filter 15 when of a CCD type comb filter.

A "combed" chrominance signal (C) from the chrominance output of comb filter 15 is applied to a chrominance signal processing unit 64 for generating R-Y, B-Y and G-Y color difference signals, and to an input of a low pass vertical detail filter 35. Unit 64 includes a suitable filter for passing only those signal frequencies from comb filter 15 which occupy the band of chrominance signal frequencies. Filter 35 exhibits a cut-off frequency of approximately 1.8 MHz, and selectively passes those signal frequencies present in the combed chrominance signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration as well as vertical detail enhancement and paring is accomplished as follows.

Figure 5:
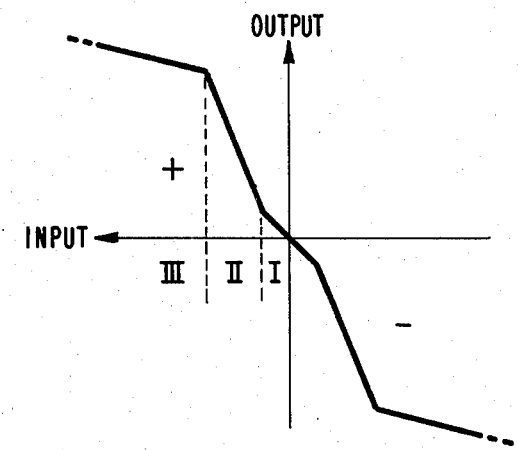

Vertical detail signals from the output of filter 35 are supplied to a non-linear signal processing circuit 50 which will be described in detail subsequently. The amplitude transfer characteristic of signal processor 50 is illustrated by FIG. 5. The following remarks concerning the response to positive (+) polarity signals also apply to signals of negative (−) polarity.

The signal processing circuits within processor 50 produce a signal amplitude transfer (gain) characteristic, as shown in FIG. 5, for three regions I, II and III with respect to three predetermined ranges of vertical detail signal amplitude. A prescribed gain response is produced in a restoration region I for low level signals (e.g., signal amplitudes of about five percent of maximum expected amplitude), so that low level detail signals along with noise and other undesired components are processed without enhancement in region I. The peak amplitude of vertical detail signals of moderate amplitude (e.g., signal amplitudes between about five percent and forty percent of maximum expected amplitude) are processed within enhancement region II with a gain of approximately three, for example, to thereby emphasize the vertical detail information and enhance picture definition in this region. The peak amplitude of relatively large amplitude vertical detail signals (e.g., between about forty percent of maximum expected amplitude and maximum amplitude) corresponding to high contrast images such as lettering, for example, are reduced in amplitude or "pared" as indicated by the amplitude response in region III, to avoid excessive contrast and to prevent kinescope "blooming" which would otherwise distort or obscure picture detail.

It is noted that in region I (vertical detail restoration), low level vertical detail signal information has been restored in an amount sufficient to preserve normal low level vertical resolution in the luminance content of a displayed image. In this example, and as will be seen hereafter, a prescribed restoration gain of approximately two is imparted to small signal amplitudes processed in region I. The gain in region I preferably is that amount of signal gain which, in a given system, is required to restore small amplitude excursions of the vertical detail signal to the luminance signal so that an ultimately reconstituted luminance signal exhibits an essentially "flat" amplitude response with respect to small amplitude detail signals. In this connection it is noted that the magnitude of the restoration gain is a function of various factors, including the signal translating characteristics of networks coupled between the outputs of comb filter 15 and a luminance processor 32 which processes ultimately reconstituted luminance signals, and the relative magnitudes of the signals appearing at the outputs of comb filter 15, for example.

The choice of the restoration gain as provided by the amplitude transfer response for region I also involves considerations of what results are acceptable in a given video signal processing system. For example, if the restoration gain is excessive, low level ALSUV signal interference is likely to be visible. If the restoration gain is insufficient, significant combing effects (i.e., signal peaks and nulls at different frequencies) will appear in the vertical detail frequency region below 2 MHz, resulting in lost low level vertical detail information. Thus the slope of the amplitude transfer characteristic in region I corresponds to the amount of signal gain necessary to produce a desired response (e.g., a flat luminance response) without introducing unacceptable side effects. The signal amplitude response for region I preferably exhibits a fixed relationship with the response of the signal path which couples the combed luminance signal (Y) from the output of the comb filter 15 to combiner 30.

In region II (vertical detail enhancement), an appropriate amount of vertical detail enhancement has been provided by imparting additional gain to signals of moderate amplitude in a manner which is considered to benefit vertical resolution of a displayed image. As will be seen hereafter, although the peak amplitude excursions of moderate amplitude signals subject to enhancement are amplified with a gain greater than the restoration gain in this example, small amplitude excursions thereof are processed with the restoration gain (i.e., without enhancement). Also, small amplitude signals not subject to enhancement are processed with the restoration gain. Thus enhancement of undesirable low level signal components including noise and ALSUV interference is essentially eliminated or reduced to an acceptable minimum, and image "smear" of low level vertical detail information is avoided.

The processed vertical detail signal from processor 50 is summed in network 30 with the combed luminance signal (Y) supplied via filter 22. The output signal from combiner 30 corresponds to a reconstituted luminance component of the video signal with the vertical detail information thereof restored (region I), enhanced (region II) and pared (region III) as discussed. The reconstituted luminance component is afterwards coupled to a luminance signal processing unit 32. An amplified luminance signal Y from unit 32 and the color difference signals from chrominance unit 64 are combined in a matrix 68 for providing R, B, and G color image representative output signals. These signals are then suitably coupled to image intensity control electrodes of a color kinescope 70.

Figure 2:
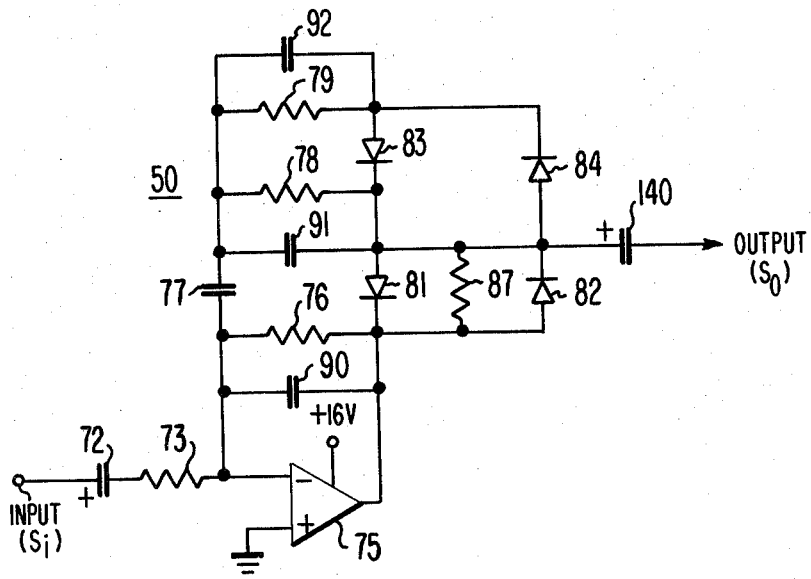
FIG. 2 shows one embodiment of a non-linear signal processing circuit according to the present invention.

Referring now to FIG. 2, there is shown one circuit embodiment of non-linear signal processor 50. Output signals from detail filter 35 are supplied as an input signal ($S_i$) via a coupling capacitor 72 and an input resistor 73 to an inverting input of an operational amplifier 75 included in processor 50. A non-inverting input of amplifier 75 is coupled to a point of reference potential (e.g., ground).

A first feedback network coupled between the output and inverting input of amplifier 75 comprises a feedback resistor 76. A second feedback path includes the parallel combination of coring diodes 81 and 82 with a resistor 87, a feedback resistor 78, and a coupling capacitor 77. Diodes 81 and 82 are mutually arranged to conduct in response to opposite polarities of a signal developed at the output of amplifier 75, as will be discussed. A third feedback network includes parallel coupled diodes 83 and 84, a feedback resistor 79, and capacitor 77. Diodes 83 and 84 are mutually arranged to conduct in response to opposite polarities of an applied signal, as will also be discussed. An output signal ($S_o$) from processor 50 is coupled via a coupling capacitor 140 to the second input of combiner 30 (FIG. 1).

Neglecting capacitors 90, 91 and 92 for the moment, signal processor circuit 50 manifests a non-linear composite amplitude transfer function as shown in FIG. 5, for imparting different amounts of signal gain to signals having amplitudes within three ranges designated as I, II and III in FIG. 5. The value of capacitor 77 is chosen sufficiently large so that the D.C. voltage across capacitor 77 substantially equals the D.C. level at the output of amplifier 75, after an initial settling time.

As mentioned above and as discussed in the copending U.S. patent application of W. A. Lagoni and J. S. Fuhrer noted previously, it is important that the detail information associated with small amplitude signals be restored to prevent "smearing" of the vertical detail content of the luminance signal. This function is provided by resistor 87 in the circuit of FIG. 2.

Figure 4:
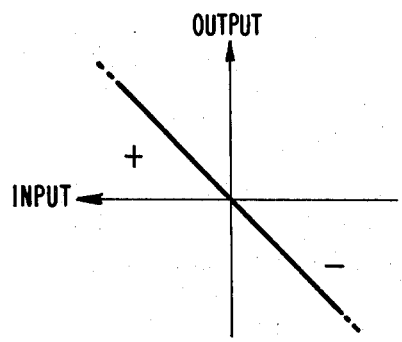
FIGS. 4-6 depict amplitude response characteristics which are useful in understanding the operation of circuits according to the invention.

Diodes 81 and 82 are non-conductive for small signal amplitudes. Resistor 87 is a linear device which, in circuit 50, permits small amplitude detail signals to be processed with the prescribed restoration gain (see FIG. 4) in region I, as shown by the amplitude transfer characteristic of FIG. 5. The restoration signal gain $A_I$ (approximately two) imparted to output signal $S_o$ after processing in region I is given by the following expression, where $R_{73}$, $R_{78}$ and $R_{87}$ correspond to the respective values of resistors 73, 78 and 87, and $R_{P3}$ corresponds to the parallel combination of resistor 76 with the series sum of resistors 78 and 87:

$$A_I = (R_{P3}/R_{73}) \times (R_{78}/R_{78} + R_{87}).$$

Resistor 87 does not affect the signal gain imparted to moderate and large amplitude signals subject to processing in regions II and III as will be discussed, since resistor 87 is "short circuited" or bypassed when diodes 81 and 82 conduct in response to applied moderate and large amplitude signals.

As the amplitude of the signal appearing at the output of amplifier 75 increases above the threshold conduction level of diodes 81 and 82 by a moderate amount (corresponding to signals subject to processing in region II), diodes 81 and 82 are caused to conduct. The signal gain for processor circuit 50 in region II ($A_{II}$) is then determined to be greater than the restoration gain, or approximately three, in accordance with the following expression, where $R_{P1}$ corresponds to the value of the parallel combination of resistors 76 and 78, and $R_{73}$ corresponds to the value of resistor 73:

$$A_{II} = R_{P1}/R_{73}.$$

The gain imparted to moderate amplitude signals is illustrated by the amplitude transfer function for region II in FIG. 5. In this connection it is noted that small amplitude excursions of moderate amplitude signals are translated with the restoration gain, while the peak amplitude excursions are amplified as indicated above. The width of region I for both signal polarities is a function of the ratio of the value of resistor 76 to the value of resistor 73.

The amplitude transfer function associated with large amplitude detail signals corresponding to those signals associated with region III in FIG. 5, is determined by the feedback network including resistor 79 and paring diodes 83 and 84, which are rendered conductive in response to the peak amplitude excursions of the large amplitude signals. Diodes 81 and 82 also conduct at this time. This network serves to pare the peak amplitude excursions of the large amplitude detail signals in region III by causing these peak excursions to be processed with less than the restoration gain. The signal gain in this instance for region III ($A_{III}$) is given by the following expression, where $R_{P2}$ corresponds to the value of the parallel combination of resistors 76, 78 and 79, and $R_{73}$ corresponds to the value of resistor 73:

$$A_{III} = R_{P2}/R_{73}.$$

In this connection it is noted that small amplitude excursions of the large amplitude signals are translated with the restoration gain, moderate amplitude excursions are processed with greater than the restoration gain, and peak amplitude excursions are processed with less than the restoration gain.

Thus the composite amplitude transfer function of circuit 50, as shown by FIG. 5, exhibits three gain regions for three predetermined levels of signal amplitude, for both positive (+) and negative (−) signal polarities. The frequency response of signals processed within any of the three gain regions can be tailored by employing filter capacitors such as capacitors 90, 91 and 92 in parallel with the appropriate feedback resistor as shown. In this example, the frequency bandwidth of processed small amplitude signals (region I) is proportional to the reciprocal of the value of capacitor 90. The frequency bandwidth of processed moderate amplitude signals (region II) is proportional to the reciprocal of the sum of the values of capacitors 90 and 91. The frequency bandwidth of processed large amplitude signals (region III) is proportional to the reciprocal of the sum of the values of capacitors 90, 91 and 92.

Figure 3:
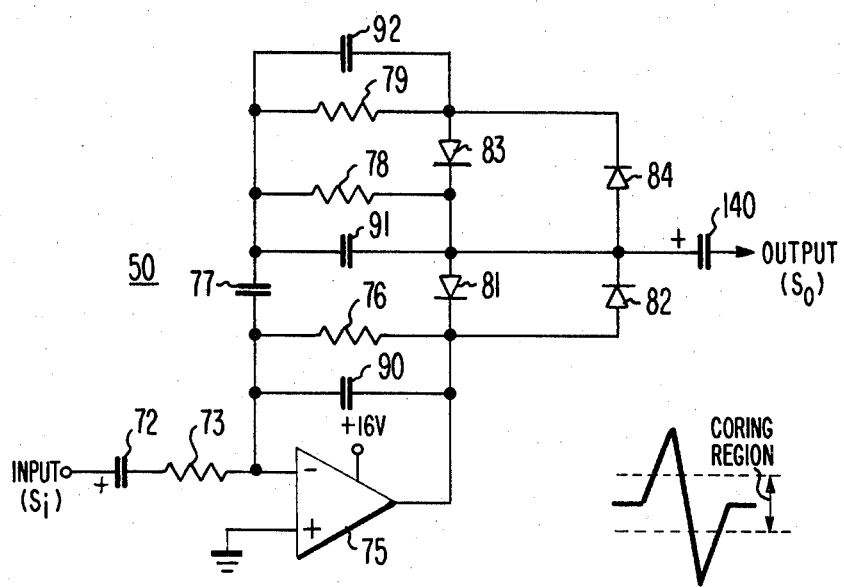
FIG. 3 depicts a modified version of the circuit shown in FIG. 2.

The circuit of FIG. 3 is identical to that of FIG. 2, except that resistor 87 in FIG. 2 has been removed. The amplitude transfer function for the circuit of FIG. 3 is given by FIG. 6. This transfer function differs from that of FIG. 5 in that small amplitude signals are "cored", or inhibited, in region I due to diodes 81 and 82 being non-conductive at this time. This response corresponds to a zero gain response in region I, whereby small amplitude signals do not appear as output signals ($S_o$). Small amplitude signals do not appear as output signals ($S_o$) since diodes 81, 82 and 83, 84 are non-conductive at this time and the inverting input (−) of operational amplifier 75 represents a virtual ground point, causing no signal currents to flow to the circuit output via resistors 78, 79 or capacitors 77, 91, 92 under these conditions.

Figure 7:
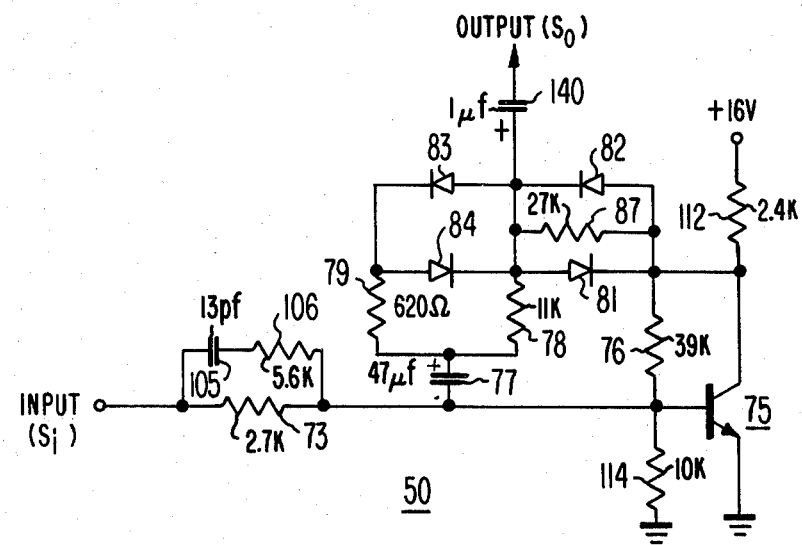
FIG. 7 shows another embodiment of a circuit according to the invention.

FIG. 7 illustrates another circuit embodiment of processor 50, which is similar to the circuit arrangement of FIG. 2. Corresponding elements in the circuits of FIGS. 2 and 7 are identified by the same reference numbers.

In this embodiment, a common emitter amplifier transistor 75 has a base input electrode corresponding to an inverting input, a grounded emitter electrode, and a collector output electrode coupled to a source of operating supply voltage (+16 volts) via a collector load impedance 112. The open loop gain for transistor 75 is primarily determined by the value of load impedance 112, and is sufficiently high to approximate the open loop gain of an operational amplifier (e.g., amplifier 75 in FIG. 2).

Vertical detail signals ($S_i$) from filter 35 are supplied to the base input of transistor 75 via a network including input resistor 73, a capacitor 105 and a resistor 106 arranged as shown. The latter two elements are employed to frequency compensate the open loop frequency response of transistor 75. The input signal ($S_i$) need not be A.C. coupled when the input signal exhibits a stable, predictable D.C. level as is assumed to be the case in this example, in which the input signal is D.C. coupled to the base of transistor 75. This D.C. level in conjunction with resistors 73, 76 and 114 serve to establish a desired operating point for transistor 75.

As in the case of the FIG. 2 circuit, resistor 76 in FIG. 7 determines the width of region I (i.e., the restoration gain region for both signal polarities) in conjunction with resistor 73 and the threshold conduction level of diodes 81, 82. Feedback capacitor 77 exhibits low D.C. current leakage and assists to maintain diodes 81–84 properly biased to produce a symmetrical transfer function. The output signal ($S_o$) is A.C. coupled via a capacitor 140 to inhibit D.C. current flow which can upset the desired symmetry of the composite transfer function (FIG. 5). The frequency response of signals processed within any of the three gain regions can be tailored by employing capacitive feedback as explained in connection with FIG. 2.

Figure 6:
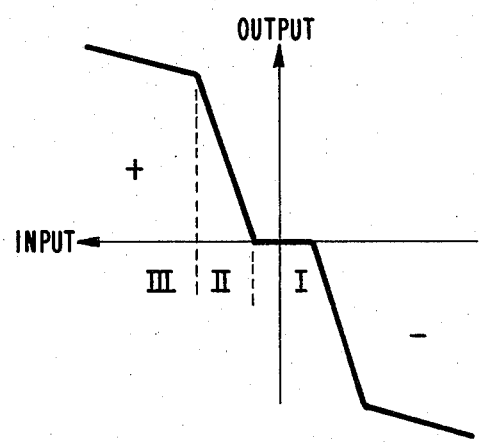

For either of the circuit arrangements of FIGS. 2 or 7, the composite transfer function shown by FIG. 5 can be modified to suit the requirements of a given system. For example, the response in region I can be eliminated by removing resistor 78 and short circuiting diodes 81, 82 and resistor 87 (e.g., by connecting a wire across resistor 87). Low level signal restoration in region I can be eliminated by removing resistor 87, as indicated by FIGS. 3 and 6. Large amplitude signal paring in region III can be eliminated by removing diodes 83, 84 and resistor 79.

It is also noted that the described vertical detail signal processing arrangement is unaffected by variations in the D.C. level of the luminance component. Due to the manner in which a comb filter derives a combed chrominance signal by employing a subtractive signal combining process as is known, the combed chrominance signal exhibits a zero D.C. component. The D.C. component of the combed chrominance signal therefore does not upset the D.C. bias component developed as the comb filter chrominance output. Processing of the vertical detail signal, as derived from the comb filter chrominance output, can therefore be centered predictably about the D.C. bias component when the comb filter chrominance output is D.C. coupled to the vertical detail signal processing network. Since the reference level about which signal processing is accomplished is fixed predictably, well-defined restoration, enhancement and paring regions result.

What is claimed is:

1. A circuit for processing video signals, comprising:
a threshold conduction switching network having an input and an output;
an amplifier having an input terminal and an output terminal, said amplifier including an amplifier device having an input and an output, said output of said amplifier device being separate from said output terminal of said amplifier, with said threshold conduction switching network coupled therebetween;
a first feedback path between said output and input of said amplifier device, including a first impedance; and
a second feedback path between said output and input of said amplifier device, including a second impedance coupled between said amplifier output terminal and the input of said amplifier device, and said threshold conduction switching network having its input coupled to said output of said amplifier device and its output coupled to said output terminal; said switching network (a) exhibiting one conductive state in response to signal amplitudes of first magnitudes within a first range; and (b) exhibiting another conductive state in response to signal amplitudes of second magnitudes greater than said first magnitudes within a second range.

2. A circuit for processing video signals, comprising:
an amplifier having an input terminal and an output terminal, said amplifier including an amplifier device having an input and an output;
a first feedback path between said output and input of said amplifier device, including a first impedance;
a second feedback path between said output and input of said amplifier device, including a second impedance and a threshold conduction switching network having an input coupled to said output of said amplifier device and an output coupled to said output terminal; said switching network (a) exhibiting one conductive state in response to signal amplitudes of first magnitudes within a first range, and (b) exhibiting another conductive state in response to signal amplitudes of second magnitudes greater than said first magnitudes within a second range; and
a third feedback path between said output and input of said amplifier device including a third impedance and an additional threshold conduction switching network having an input coupled to said output of said switching network in said second path, said additional switching network (a) exhibiting one conductive state in response to signal amplitudes of said first and second magnitudes, and (b) exhibiting another conductive state in response to signal amplitudes of third magnitudes greater than said first and second magnitudes within a third range.

3. A circuit for processing video signals, comprising:
a threshold conduction switching network having an input and an output;
an amplifier having an input terminal and an output terminal, said amplifier including an amplifier device having an input and an output, said output of said amplifier device being separate from said output terminal of said amplifier, with said threshold conduction switching network coupled therebetween;
a first feedback path between said output and input of said amplifier device, including a first impedance; and
a second feedback path between said output and input of said amplifier device, including a second impedance coupled between said amplifier output terminal and the input of said amplifier device, a third impedance, and said threshold conduction switching network, said switching network having its input coupled to said output of said amplifier device and its output coupled to said output terminal, and being coupled to said third impedance for switchably controlling the current conduction therethrough, said switching network (a) exhibiting one conductive state in response to signal amplitudes of first magnitudes within a first range, and (b) exhibiting another conductive state in response to signal amplitudes of second magnitudes greater than said first magnitudes within a second range.

4. A circuit for processing video signals, comprising:
an amplifier having an input terminal and an output terminal, said amplifier including an amplifier device having an input and an output;
a first feedback path between said output and input of said amplifier device, including a first impedance;
a second feedback path between said output and input of said amplifier device, including a second impedance, a third impedance, and a threshold conduction switching network, said switching network having an input coupled to said output of said amplifier device and an output coupled to said output terminal, and being coupled to said third impedance for switchably controlling the current conduction therethrough, said switching network (a) exhibiting one conductive state in response to signal amplitudes of first magnitudes within a first range, and (b) exhibiting another conductive state in response to signal amplitudes of second magnitudes greater than said first magnitudes within a second range; and
a third feedback path between said output and input of said amplifier device, including a fourth impedance and an additional threshold conduction switching network having an input coupled to said output of said switching network in said second path, said additional switching network (a) exhibiting one conductive state in response to signal amplitudes of said first and second magnitudes, and (b) exhibiting another conductive state in response to signal amplitudes of third magnitudes greater than said first and second magnitudes within a third range.

5. A circuit for processing video signals, comprising:
an amplifier having an input terminal and an output terminal, said amplifier including an amplifier device having an input and an output;
a first feedback path between said output and input of said amplifier device, including a first impedance;
a second feedback path between said output and input of said amplifier device, including a second impedance, a third impedance, and a threshold conduction switching network, said switching network having an input coupled to said output of said amplifier device and an output coupled to said output terminal, and being coupled to said third impedance for switchably controlling the current conduction therethrough, said switching network (a) exhibiting one conductive state in response to signal amplitudes of first magnitudes within a first range, and (b) exhibiting another conductive state in response to signal amplitudes of second magnitudes greater than said first magnitudes within a second range; and a third feedback path between said output and input of said amplifier device, including a fourth impedance and an additional threshold conduction switching network having an input coupled to said output of said switching network in said second path, said additional switching network (a) exhibiting one conductive state in response to signal amplitudes of said first and second magnitudes, and (b) exhibiting another conductive state in response to signal amplitudes of third magnitudes greater than said first and second magnitudes within a third range; and wherein said circuit exhibits:

a first signal gain greater than zero in response to signal amplitudes of said first magnitudes;

a second signal gain greater than said first gain in response to signal amplitudes of said second magnitudes; and a third signal gain less than said first gain in response to signal amplitudes of said third magnitude.

6. A circuit according to claim 4, wherein:
one of said first, second and third feedback paths includes a filter for determining the frequency response of said one path.

7. A circuit according to claim 4, wherein:
said switching network in said second path (a) exhibits a non-conductive state in response to signal amplitudes of said first magnitudes, and (b) exhibits a conductive state in response to signal amplitudes of said second and third magnitudes for substantially inhibiting current conduction through said third impedance; and said additional switching network in said third path (a) exhibits a non-conductive state in response to signal amplitudes of said first and second magnitudes, and (b) exhibits a conductive state in response to signal amplitudes of said third magnitudes.

8. A circuit for processing video signals, comprising:
an amplifier having an input terminal and an output terminal, said amplifier including an amplifier device having an input and an output;

a first feedback path between said output and input of said amplifier device, including a first impedance;

a second feedback path between said output and input of said amplifier device, including a second impedance, a third impedance, and a threshold conduction switching network, said switching network having an input coupled to said output of said amplifier device and an output coupled to said output terminal, and being coupled to said third impedance for switchably controlling the current conduction therethrough, said switching network (a) exhibiting a non-conductive state in response to signal amplitudes of first magnitudes within a first range, and (b) exhibiting a conductive state in response to signal amplitudes of second and third progressively greater magnitudes greater than said first magnitudes within respective second and third ranges, for substantially inhibiting current conduction through said third impedance; and a third feedback path between said output and input of said amplifier device, including a fourth impedance and an additional threshold conduction switching network having an input coupled to said output of said switching network in said second path, said additional switching network (a) exhibiting a non-conductive state in response to signal amplitudes of said first and second magnitudes, and (b) exhibiting a conductive state in response to signal amplitudes of said third magnitudes greater than said first and second magnitudes within a third range; wherein said second feedback path includes the parallel combination of said switching network in said second path and said third impedance, in series with said second impedance; and said third feedback path includes the series combination of said additional switching network and said fourth impedance.

9. Apparatus according to claim 8, wherein:
said switching networks in said second and third paths each comprise a bidirectionally conductive network.

10. A circuit for processing video signals, comprising:
an amplifier having an input terminal and an output terminal, said amplifier including an amplifier device having a signal inverting input and an output;

an input impedance coupled between said input terminal and said input of said amplifier device;

a first feedback path between said output and input of said amplifier device, including a first impedance;

a second feedback path between said output and input of said amplifier device, including second and third series impedances, and a bidirectionally conductive switching network with an input coupled to said amplifier device output and an output coupled to said output terminal, said switching network being arranged in parallel with said third impedance for switchably controlling the current conduction therethrough and (a) being rendered non-conductive in response to signal amplitudes of first magnitudes within a first range, for causing said amplifier to exhibit a first signal gain greater than zero, and (b) being rendered conductive in response to signal amplitudes of second magnitudes within a second range, for causing said amplifier to exhibit a second gain greater than said first gain; and a third feedback path between said output and input of said amplifier device, including a fourth impedance and an additional bidirectionally conductive switching network with an input coupled to said output of said switching network of said second path, said additional switching network (a) being rendered non-conductive in response to signal amplitudes of said first and second magnitudes, and (b) being rendered conductive in response to signal amplitudes of third magnitudes greater than said first and second magnitudes within a third range, for causing said amplifier to exhibit a third signal gain less than said first signal gain.

11. Video image vertical detail signal processing apparatus in a system for processing a video signal containing image representative luminance and chrominance components disposed within a frequency spectrum of said video signal in frequency interleaved relation, said system including comb filter means for providing at a first output a combed luminance signal with amplitude peaks at integral multiples of an image line scanning frequency and amplitude nulls at odd multiples of one-half said line frequency, and for providing at a second output a combed chrominance signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output, said apparatus comprising:

means coupled to said second output of said comb filter means for selectively passing said signal frequencies corresponding to vertical detail signal information, to the exclusion of signals occupying the band of chrominance signal frequencies;

means for translating said vertical detail signal, including:

an amplifier having an input terminal and an output terminal, said amplifier including an amplifier device having an input and an output;

a first feedback path between said output and input of said amplifier device, including a first impedance;

a second feedback path between said output and input of said amplifier device, including a second impedance, a third impedance, and a threshold conduction switching network, said switching network having an input coupled to said output of said amplifier device and and output coupled to said output terminal, and being coupled to said third impedance for switchably controlling the current conduction therethrough, said switching network (a) exhibiting one conductive state in response to signal amplitudes of first magnitudes within a first range, and (b) exhibiting another conductive state in response to signal amplitudes of second magnitudes greater than said first magnitudes within a second range; and a third feedback path between said output and input of said amplifier device, including a fourth impedance and an additional threshold conduction switching network having an input coupled to said output of said switching network in said second path, said additional switching network (a) exhibiting one conductive state in response to signal amplitudes of said first and second magnitudes, and (b) exhibiting another conductive state in response to signal amplitudes of third magnitudes greater than said first and second magnitudes within a third range;

means for combining signals translated by said translating means with said combed luminance signal from said first output of said comb filter means to provide said luminance component; and luminance signal utilization means for receiving said luminance component from said combining means.

12. Apparatus according to claim 11, wherein:

said video signal processing system comprising a color television receiver.

* * * * *